March 7, 1933.  F. G. BAUM  1,900,688
AIRPLANE WING
Filed March 6, 1930   2 Sheets-Sheet 1
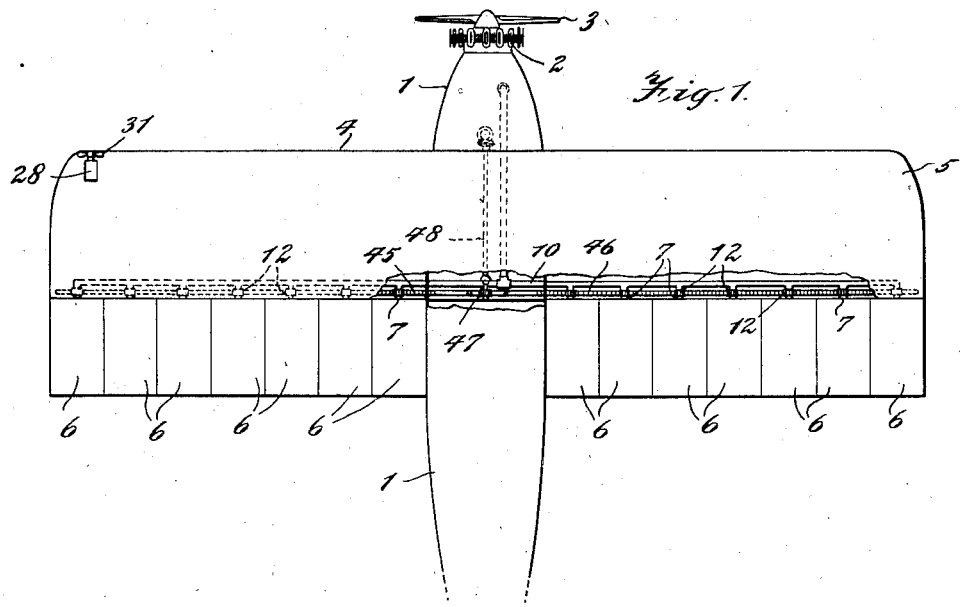
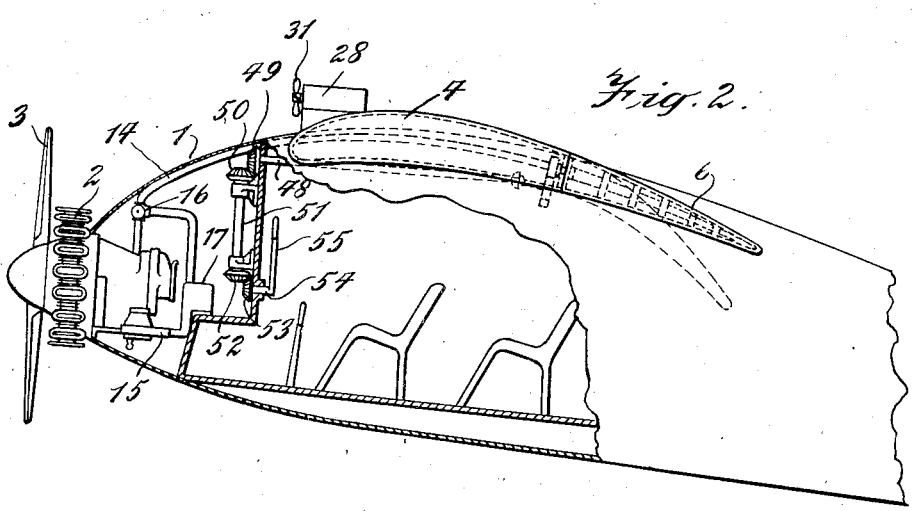
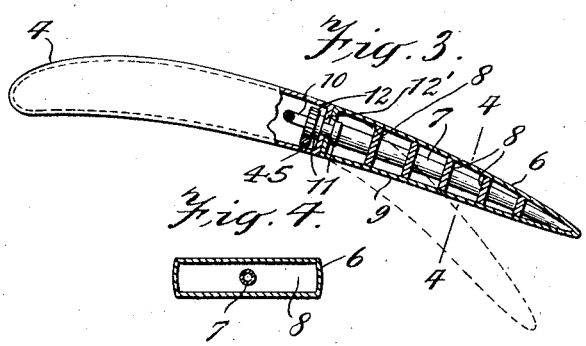
INVENTOR
Frank G. Baum
BY
Victor D. Borst
ATTORNEY March 7, 1933.  F. G. BAUM  1,900,688
AIRPLANE WING
Filed March 6, 1930  2 Sheets-Sheet 2
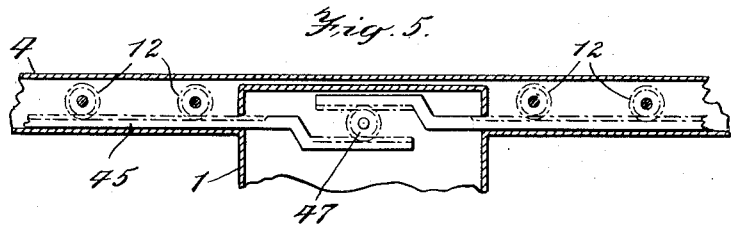
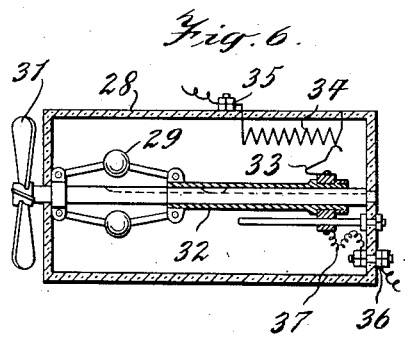
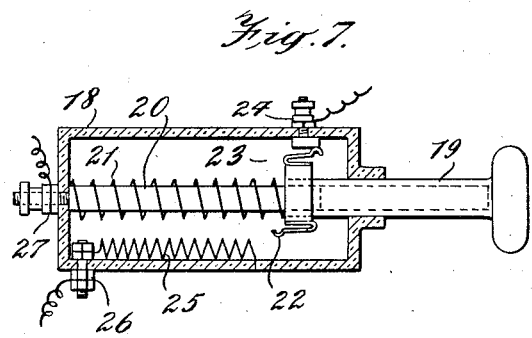
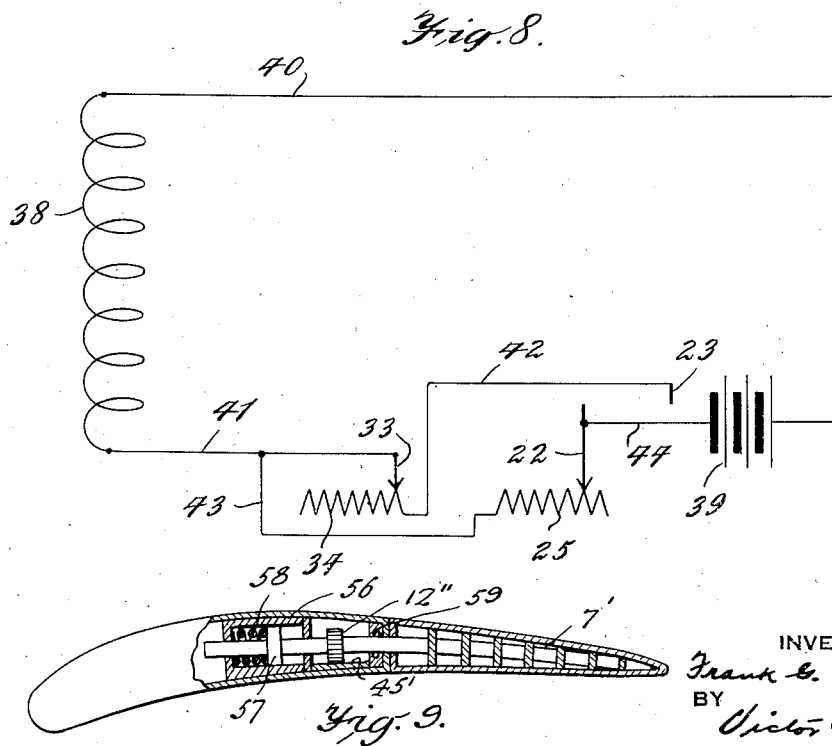
INVENTOR
Frank G. Baum
BY
Victor D. Borst
ATTORNEY Patented Mar. 7, 1933

1,900,688

UNITED STATES PATENT OFFICE

FRANK G. BAUM, OF SAN FRANCISCO, CALIFORNIA

AIRPLANE WING

Application filed March 6, 1930. Serial No. 433,555.

In the construction of airplanes, it has been the more common practice to make the wing structures inflexible and rigid with the fuselage, the wings being designed in accordance with the desired carrying capacity and the speed of the airplane. In such constructions, with a given design of wing, the lifting power of the wings is proportional to the square of the speed of the airplane relative to the surrounding air, and if the wings have been designed for a high cruising speed, the take off and landing speeds are correspondingly high. Attempts have been made to design a wing which would permit a high cruising speed and a relatively low take off and landing speed, and it is to such a wing that my invention relates.

Heretofore, such wings resulted in sacrificing some important feature of the standard construction, such as the rigidity of the wing structure, or where the wing structure is inflexible, the construction of the wing is such that the cruising speed of the airplane is materially affected.

By my invention, I am enabled to increase the lifting power of the wings at take off and landing without materially affecting the cruising speed of the airplane or sacrificing the strength inherent in a rigid wing structure. I employ a construction in which auxiliary wings adjustable to impart a greater or less longitudinal curvature thereto are secured to the trailing end of the wings extending from the fuselage at either side thereof.

A feature of my invention is the fact that the disposition of the auxiliary wings may be adjusted manually or automatically in accordance with the speed of the airplane relative to the surrounding air.

Another feature of my invention is the fact that the auxiliary wings comprise a plurality of independent sections which are secured to the wings of the airplane for rotational movement about their longitudinal axis. The sections of the auxiliary wings may be rotated to cause the air to flow between the sections and create a braking effect caused by the friction between the air and the surfaces of the auxiliary wing sections.

Another feature of my invention is the fact that the longitudinal curvature of the auxiliary wings is adjusted by fluid under pressure.

Specifically, I provide an airplane having the usual fuselage. To the fuselage the wings are secured and extend therefrom at either side thereof. Auxiliary wings which are adjustable to impart a curvature thereto are secured to the trailing end of the first mentioned wings. The auxiliary wings consist of a plurality of independent sections of which are rotatably secured to the first mentioned or main wings. The adjustment of the auxiliary wings to change the curvature thereof may be controlled manually or automatically in accordance with the speed of the airplane relative to the surrounding air, and the sections which make up the auxiliary wings may be rotated to cause a braking effect. In starting, the auxiliary wings are curved downwardly and the sections are in alignment. The downward curvature of the auxiliary wings increases the lifting power of the wings so that the airplane will take off at a relatively low speed. As the airplane takes off and gathers speed, the auxiliary wings gradually straighten out until the cruising speed is reached at which speed the auxiliary wings form a continuation of the main wings. As the speed of the airplane decreases, the auxiliary wings again curve downwardly in accordance with the decreasing speed of the airplane. When the maximum curvature of the wings has been reached, or previous thereto if desired, the sections of the auxiliary wings are rotated to set up friction between the air and the surfaces of the auxiliary wing sections and create a braking effect to decrease the speed of the airplane before landing.

Other features of my invention will appear from the following particular description of one embodiment thereof as illustrated in the accompanying drawings in which:

Fig. 1 is a plan of an airplane with parts broken away;

Fig. 2 is an elevation, the front part of the airplane being in section;

Fig. 3 is an end elevation of a wing, the auxiliary wing secured thereto being shown in section;

Fig. 4 is a section of the auxiliary wing taken on the line 4—4 of Figure 3;

Fig. 5 is a fragmentary section taken on the line 5—5 of Figure 1;

Fig. 6 is a longitudinal section of the device for automatically controlling the adjustment of the auxiliary wings;

Fig. 7 is a longitudinal section of the device for manually controlling the adjustment of the auxiliary wings;

Fig. 8 is a wiring diagram of the system for controlling the adjustment of the auxiliary wings; and Fig. 9 is an end elevation of a wing, the auxiliary wing secured thereto being shown in section and illustrating a modified form of control.

In the drawings, I have shown my invention as embodied in an airplane of the monoplane type. The invention is, however, equally applicable to the other types of airplanes such as biplanes, and also to hydroplanes. The airplane shown comprises a fuselage 1 in which the motor 2, the shaft of which carries the propeller 3, is mounted. To the fuselage wings 4 and 5 are secured and extend therefrom at either side thereof. Auxiliary wings which consist of a plurality of independent sections 6 are secured to the trailing end of the wings 4 and 5.

Each of the sections of the auxiliary wings has a curved tubular central frame member 7, normally curved as shown in Figure 2 and as shown in broken lines in Figure 3, and having sufficient inherent strength to retain this normal shape against the pressure of the air. The outer end, that is, the trailing end of the tubular frame member is closed. At spaced intervals along the central tubular frame members 7, there are lateral fins 8 secured thereto which support the fabric covering 9. At the inner end the tube enters the wing of the airplane and is connected to a common fluid supply pipe 10, the connection between the supply pipe and the tube being such as to permit rotational movement of the tube. The tube 7 is rotatably secured to the wing by collars 11 secured to the tube on opposite sides of the end wall 12' of the wing. Within the wing of the airplane, between the inner collar 11 and the common supply pipe 10, a pinion 12 is secured to the tube 7 for rotation therewith, the purpose of which will be hereinafter described.

The common fluid supply pipe 10, common to the tubes in all of the sections 6 of the auxiliary wings, is connected by means of a pipe line 14 to a rotary pump 15. The pump 15 is secured to the frame of the motor 2 and is connected to the motor for operation thereby. Intermediate the pump 15 and the common supply pipe 10 in some such position as shown, a valve 16 is interposed in the pipe 14. The valve 16 is a two way valve and has a connection to a reserve tank 17 which in turn is connected to the intake end of the pump 15. As the valve is moved in one direction the common supply pipe is connected to the high pressure end of the pump 15 and the pressure is transmitted through the fluid in the system to the tubular frame members 7 which tend to straighten out and when the valve 16 is fully opened in this direction and the full pressure of the pump transmitted to the frame members 7 they straighten out the sections of the auxiliary wings to form a continuation of the wings 4 and 5. When moved to close the connection between the tubular frame members 7 and the high pressure side of the pump 15, the valve 16 opens a connection between the tubular frame members, and the tank 17, thereby releasing the pressure and permitting the tubular frame members to assume their normal curvature. The valve 16 is electrically actuated, and may be controlled by a manually actuated device or a device which is responsive to the speed of the airplane relative to the surrounding air.

The device for manually controlling the valve 16 is shown in Figure 7 in which there is shown a cylinder 18 having a plunger 19 extending through one end thereof. The cylinder 18 is formed from insulating material such for example as hard rubber. The plunger 19, which is hollow, rides upon a rod 20 secured in the cylinder 18 and is resiliently urged to the inoperative position by a convolute spring 21 surrounding the rod 20 and acting between the inner end of the plunger and the opposite end wall of the cylinder. On the inner end of the plunger 19, there is secured a contact collar 22 which in the inoperative position of the plunger contacts with a contact brush 23 to which there is connected an external binding post 24. Upon pressing the plunger inwardly against the action of the spring 21, the collar becomes disconnected from the brush 23 and contacts with a variable resistance 25 secured to the inner wall of the cylinder 18. The resistance is connected to an external binding post 26. A binding post 27 connected to the rod 20 furnishes an electrical connection to the plunger 19, and as the plunger is depressed, the electrical resistance between the connections to the binding posts 26 and 27 is decreased and the valve 16 is actuated accordingly.

The device for automatically controlling the valve 16 in accordance with the speed of the airplane is shown in Figure 6. This device which consists of a cylinder 28 enclosing a centrifugal device 29 is adapted to be placed on the leading edge of one of the wings 4 or 5. Preferably, the device is secured to the wing near the outer edge thereof so as not to come within the influence of the airplane propeller 3. To the shaft 30 of the centrifugal device 29 which extends through one end of the casing there is secured a propeller 31 which is driven by the air currents set up by virtue of movement of the airplane relative to the surrounding air. Within the casing 28, a hollow tube 32 is fitted over the shaft 30 and secured to the centrifugal device 29 which moves the tube longitudinally in accordance with the speed of rotation of the propeller 31 which is proportional to the speed of the airplane. To the end of the tube 32, opposite the centrifugal device 29, there is secured a contact 33 which contacts with a resistance coil 34 secured to the inner surface of the cylinder wall. The resistance 34 is connected to a binding post 35 and the tube 32 is connected to a binding post 36 through a flexible wire 37. Thus, as the rod 32 is moved longitudinally, the electrical resistance between the contacts 35 and 36 is varied, and the valve 16 is actuated accordingly.

The electrical connections between the valve controlling devices 18 and 28, are shown diagrammatically in Figure 8. In the diagram, the actuating coil of the valve 16 is represented by the coil 38 which is connected at one side thereof to a source of electrical energy 39 by a wire 40. The other side of the coil is connected by wire 41 to the binding post 31 of the movable contact 33 of the automatic control device. The resistance coil 34 is connected by a wire 42 to the contact brush 23 of the manual controlling device. There is also a connection from the side of the valve coil 38 to which the wire 41 is connected to the resistance coil 25 of the manual controlling device as indicated by the wire 43. The movable member of the manual control device, that is, the plunger 19 is connected to the source of electrical energy 39 by a wire 44. From the above description, taken in connection with the wiring diagram, it will be apparent that when the manual controlling device is actuated to control the valve 16, the automatic control device is cut out of the circuit from the source of current and when the manual device is inoperative, the resistance coil associated therewith is cut out of the circuit to the control valve 16 and the automatic control device is connected into the circuit. Thus, when the plunger 19 is depressed on the manual control device, the collar 22 moves off of the contact brush 23 and breaks the circuit from the source of current to the automatic control device. Simultaneously with breaking the circuit to the automatic control device, a circuit is completed as follows: from the source of electrical energy 39, through wire 44 to movable contact 22 on the plunger 19 of the manual control device, resistance coil 25, wires 43, and 41 to the valve coil 38, and back to the source of electrical energy through wire 40. When the plunger 19 is in the inoperative position the contact between the plunger and the resistance coil 25 is broken and the contact between the plunger and the contact brush 23 is closed and a circuit completed as follows: from the source of electrical energy to plunger 19 through wire 43, contact brush 23, wire 42, resistance coil 34 of the automatic control device, movable contact 32, wire 41 to coil 38 and back to the source of electrical energy through wire 40. Thus, the adjustment of the curvature of the sections of the auxiliary wing sections may be controlled automatically or manually by the pilot, the manual controlling device being placed within reach of the pilot.

Rotational movement of the sections of the auxiliary wings is controlled from the cabin of the airplane by means of connections to the pinions 12 secured to the tubular frame members 7. Along each of the wings 4 and 5 in engagement with all of the pinions secured to the tubular frame members of the sections of each of the auxiliary wings there is a rack 45 and a rack 46 respectively. At the longitudinal center of the airplane, the inner ends of the racks 45 and 46 overlap and are offset as shown in Figure 4. On the opposed sides of the offset portions of the racks, gear teeth are formed which engage the teeth on a pinion 47 therebetween. The pinion 47 is secured on the end of a shaft 48. On the opposite end of the shaft 48 behind the instrument board there is secured a bevel gear 49 which meshes with a bevel gear 50 secured on a shaft 51. A second gear 52 secured to the end of the shaft 51 opposite to that on which the gear 50 is secured meshes with a gear 53 secured on a shaft 54 upon which there is secured an operating handle 55 within reach of the pilot. Movement of the operating handle 55 by the pilot is transmitted through the train above described to the pinions on the tubular frame members 1 to rotate the sections of the auxiliary wings to cause the air to flow therebetween and create a braking effect due to the retarding force set up by the friction between the air and the surfaces of the sections of the auxiliary wings.

In Figure 9, there is illustrated an auxiliary wing section having a modified construction. In this form, the central frame member 7' extends through a cylinder 56 secured in the wing. Within the cylinder 56 a piston 57 operatively mounted in the cylinder is secured to the frame member 7'. A spring 58 within the cylinder acts on the forward end of the piston to move the piston rearwardly in the cylinder, the common fluid supply 10 being connected to the rear end of the cylinder so that the fluid pressure acts against the force of the spring 58. Thus, if the pressure of the fluid is cut off the piston moves rearwardly in the cylinder under the action of the spring 58 and when pressure is applied to the rear of the piston, it moves forwardly in the cylinder against the spring. This motion of the piston is transmitted to the central frame member 7' which extends through a bearing 59 at the end of the wing. As the frame member is drawn forwardly through the bearing 59 it straightens out as shown in Figure 9, and as the frame member 7' is moved rearwardly it assumes its normal curvature. The rack 45' is made sufficiently wide so that the pinion 12" on the central frame member can move with the frame member without becoming disengaged from the rack.

The function and operation of the auxiliary wings is as follows: At starting, the auxiliary wings are curved downwardly, assuming the normal curvature of the hollow tubular frame members 7 of the sections of the auxiliary wings, as shown in broken lines in Figure 3, the auxiliary wings being in lateral alignment. The downward curvature of the auxiliary wings increases the lifting power of the wings and the airplane will take off at a relatively low speed. As the airplane takes off and gathers speed, the valve 16 is actuated by the automatic control device to connect the tubular frame members to the high pressure side of the pump 15 and the tubular frame members tend to straighten out the sections of the auxiliary wings. When the cruising speed is reached, the valve 16 is fully opened so that the full pressure developed by the pump 15 is transmitted to the tubular frame members 7 which straighten out sufficiently to cause the auxiliary wing sections to form a continuation of the wings 4 and 5. As the speed of the airplane decreases, the auxiliary wings again curve downwardly in accordance with the decreasing speed of the airplane. When the auxiliary wings have reached the maximum curvature, or previous thereto, if found desirable, the pilot may move the operating handle 55 to rotate the sections of the wings to create a braking effect to decrease the speed of the airplane for landing. The curvature of the auxiliary wings is additionally at all times under the manual control of the operator.

It is obvious that various changes may be made in the embodiment shown in the drawings and above particularly described within the principle and scope of my invention as expressed in the appended claims.

I claim:

1. In an airplane, in combination with the fuselage and the main wings extending laterally therefrom, auxiliary wings adapted to have their trailing ends raised and lowered consisting of a plurality of independent sections secured to the trailing edges of the main wings for rotation about their longitudinal axis, means to control the disposition of the trailing edges of the auxiliary wings, and means for rotating the sections of the auxiliary wings about their longitudinal axis.

2. In an airplane, in combination with the fuselage and the main wings extending laterally therefrom, auxiliary wings adapted to have their trailing ends raised and lowered consisting of a plurality of independent sections secured to the trailing edges of the main wings for rotation about their longitudinal axis, means controlled automatically in response to the speed of the airplane to control the disposition of the trailing ends of the auxiliary wings, and means for rotating the sections of the auxiliary wings.

3. In an airplane, in combination with the fuselage and the main wings extending laterally therefrom, auxiliary wings adapted to have their trailing ends raised and lowered consisting of a plurality of independent sections secured to the trailing edges of the main wings for rotation about their longitudinal axis, means controlled automatically in response to the speed of the airplane to control the disposition of the trailing ends of the auxiliary wings, manual means to control the disposition of the ends of the auxiliary wings including means to render the automatic control means inoperative, and means for rotating the sections of the auxiliary wings.

4. An auxiliary wing section adapted to be secured to the trailing edge of an airplane wing and have its trailing end raised and lowered comprising a longitudinal curved frame member closed at one end, the opposite end being opened and adapted to be connected to a source of fluid under pressure.

5. In an air airplane, in combination with the fuselage and the main wings extending laterally therefrom, auxiliary wings adapted to have their trailing ends raised and lowered comprising longitudinal curved tubular frame members secured to the trailing edges of the main wings, a source of fluid under pressure connected to the tubular frame members, and means to control the admission of the fluid under pressure to the tubular frame members.

6. In an airplane, in combination with the fuselage and the main wings extending laterally therefrom, auxiliary wings comprising a plurality of independent sections, each of the sections having a longitudinal central curved tubular frame member extending into the trailing edge of the main wings and being rotatably secured therein for rotation about their longitudinal axis, a source of fluid under pressure connected to the tubular frame members, means to control the admission of fluid under pressure to the tubular frame members to vary the curvature thereof, a pinion secured on each of the ends of the tubular frame members extending into the main wings, a rack in each of the main wings engaging the pinions on the tubular frame members, and means for moving the rack longitudinally thereof to rotate the sections of the auxiliary wings.

In witness whereof, I hereunto subscribe my signature.

FRANK G. BAUM.